(12) United States Patent
Joseph et al.

(10) Patent No.: US 8,206,246 B2
(45) Date of Patent: Jun. 26, 2012

(54) SYSTEM AND METHOD FOR IMPROVING A BASKETBALL PLAYER'S SHOOTING

(75) Inventors: John G. Joseph, Upper Sandusky, OH (US); Troy David Geiser, Findlay, OH (US)

(73) Assignee: Shoot-A-Way, Inc., Upper Sandusky, OH (US)

( * ) Notice: Subject to any disclaimer, the term of this patent is extended or adjusted under 35 U.S.C. 154(b) by 0 days.

(21) Appl. No.: 12/420,122

(22) Filed: Apr. 8, 2009

(65) Prior Publication Data

US 2010/0261557 A1 Oct. 14, 2010

(51) Int. Cl.
*A63B 69/00* (2006.01)

(52) U.S. Cl. .................. 473/433; 473/422; 473/447

(58) Field of Classification Search ............... 473/422, 473/431–433, 447, 479–481
See application file for complete search history.

(56) References Cited

U.S. PATENT DOCUMENTS

| | | | |
|---|---|---|---|
| 1,223,386 A | 4/1917 | Handelan | |
| 2,908,266 A | 10/1959 | Cooper | |
| 3,776,550 A | 12/1973 | McNabb | |
| 3,802,703 A * | 4/1974 | Van Tassel | 473/433 |
| 3,878,828 A | 4/1975 | Francesco | |
| 4,168,695 A | 9/1979 | Haller et al. | |
| 4,262,648 A | 4/1981 | Wegener et al. | |
| 4,471,746 A | 9/1984 | Ando | |
| 4,579,340 A | 4/1986 | Jenkins et al. | |
| 4,678,189 A | 7/1987 | Koss | |
| 4,714,248 A | 12/1987 | Koss | |
| 4,717,149 A * | 1/1988 | Juhl | 473/429 |
| 4,913,431 A | 4/1990 | Jakobs | |
| 4,936,577 A | 6/1990 | Kington et al. | |
| 4,940,231 A | 7/1990 | Ehler | |
| 4,955,605 A | 9/1990 | Goldfarb | |
| 5,016,875 A | 5/1991 | Joseph | |
| 5,125,651 A | 6/1992 | Keeling et al. | |
| 5,312,099 A | 5/1994 | Oliver, Sr. | |
| 5,393,049 A | 2/1995 | Nelson | |
| 5,409,211 A | 4/1995 | Adamek | |
| 5,417,196 A | 5/1995 | Morrison et al. | |
| 5,681,230 A | 10/1997 | Krings | |
| 5,746,668 A | 5/1998 | Ochs | |
| 5,776,018 A | 7/1998 | Simpson et al. | |

(Continued)

FOREIGN PATENT DOCUMENTS

WO 9532033 A1 11/1995

(Continued)

OTHER PUBLICATIONS

The Gun 6000 Series, Shoot-A-Way, Inc., Upper Sandusky, Ohio, http://www.shootaway.com/Gun1.htm/, at least as early as Jun. 2000.

(Continued)

*Primary Examiner* — Mitra Aryanpour
(74) *Attorney, Agent, or Firm* — Jacox, Meckstroth & Jenkins

(57) ABSTRACT

A system and method for improving a player's efficiency in shooting by providing a player with various shooting challenge routines at which a player makes either a total number of shots or a total number shots in a row. Statistics regarding the player's performance are stored, printed and/or evaluated and the player can use the information to improve his or her efficiency at one or more of the plurality of different locations where the player shoots the basketball.

39 Claims, 12 Drawing Sheets

U.S. PATENT DOCUMENTS

| | | | |
|---|---|---|---|
| 5,813,926 A | 9/1998 | Vance | |
| 5,842,699 A | 12/1998 | Mirando et al. | |
| 6,224,503 B1 | 5/2001 | Joseph | |
| 6,389,368 B1 | 5/2002 | Hampton | |
| 6,731,316 B2 * | 5/2004 | Herigstad et al. | 715/864 |
| 7,938,746 B2 * | 5/2011 | Chipperfield | 473/434 |
| 2003/0023145 A1 * | 1/2003 | Lee et al. | 600/300 |
| 2007/0026975 A1 | 2/2007 | Marty et al. | |
| 2009/0137347 A1 * | 5/2009 | Jenkins et al. | 473/433 |

FOREIGN PATENT DOCUMENTS

WO    WO 2005062841 A2 *    7/2005

OTHER PUBLICATIONS

Dr. Dish™, Airborne Athletics Inc., Belle Plaine, Minnesota, http://www.drdishbasketball.com/, at least as early as Jul. 29, 2003.

* cited by examiner

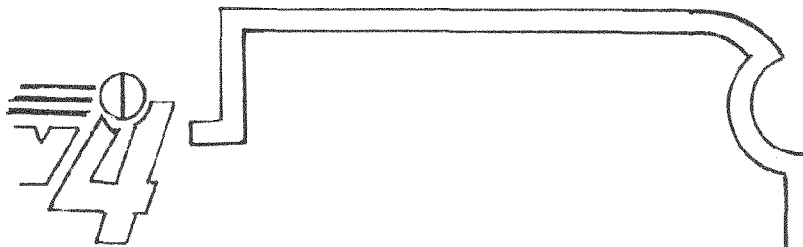
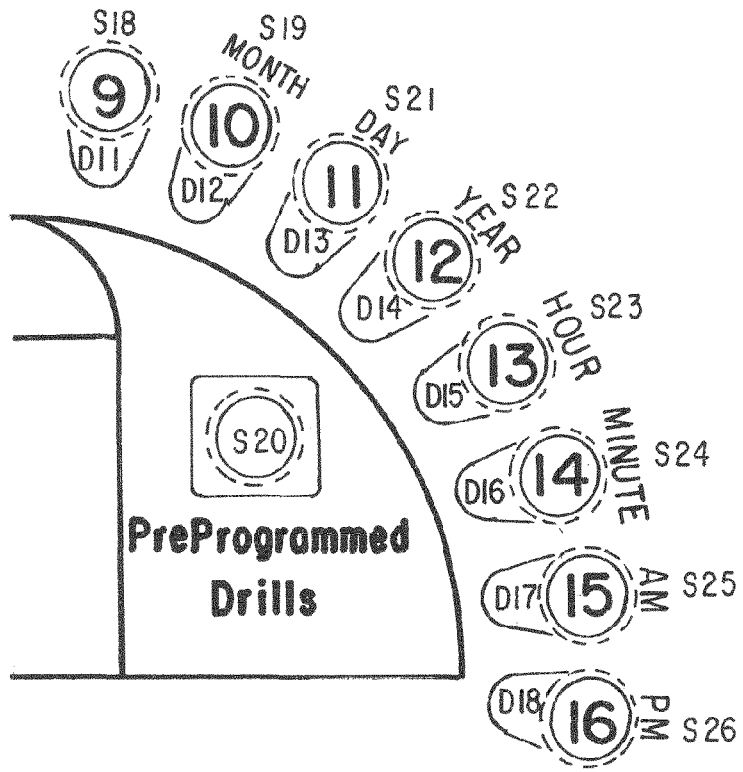
FIG. 3B
then follow these 3 EASY STEPS
e locations for balls to be passed
tween passes
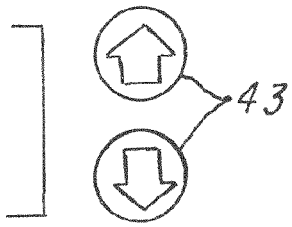

| SHOT | MAKES | TOTAL ATTEMPTS | MAKES IN A ROW | TOTAL MAKES | PERCENTAGE TOTAL MAKES/ TOTAL ATTEMPTS |
|---|---|---|---|---|---|
| USER NAME: JOHN SMITH – USER DEFINED PERIOD 11-1-09 / 3-2-10 ||||||

45, 55, 56, 50, 58, 60

Fig. 6: Example Printout

Shooting Workout Printout

| Spot | Makes | Total Shots | Percentage |
|------|-------|-------------|------------|
| User: Joe Thomas | | | |
| User defined Time Period: 1/1/09 to 3/26/09 | | | |
| 0 | 453 | 634 | 71.5% |
| 1 | 200 | 234 | 85.5% |
| 2 | 100 | 243 | 41.2% |
| 3 | 121 | 323 | 37.5% |
| 4 | 123 | 232 | 53.0% |
| 5 | 105 | 234 | 44.9% |
| 6 | 178 | 343 | 51.9% |
| 7 | 186 | 343 | 54.2% |
| 8 | 543 | 1006 | 54.0% |
| 9 | 66 | 132 | 50.0% |
| 10 | 80 | 232 | 34.5% |
| 11 | 109 | 343 | 31.8% |
| 12 | 243 | 545 | 44.6% |
| 13 | 116 | 343 | 33.8% |
| 14 | 298 | 545 | 54.7% |
| 15 | 100 | 232 | 43.1% |
| 16 | 180 | 423 | 42.6% |
| TOTAL | 3201 | 6387 | 50.1% |

CHALLENGE SHOOTING ACCURACY - PROCEDURE A

Challenge Shooting Accuracy - Procedure B
Multi Shots which MUST BE MADE at 1 or Each Spot

SYSTEM AND METHOD FOR IMPROVING A BASKETBALL PLAYER'S SHOOTING

BACKGROUND OF THE INVENTION

1. Field of the Invention

A system and method for improving a player's shooting using at least one or a plurality of shooting challenge routines.

2. Description of the Related Art

In the past, various devices have been used to throw basketballs at a player so that the player can practice shooting the basketballs from a location and toward a basketball hoop on a basketball backboard. Several devices are offered by the assignee of the present application and marketed under the trademark THE GUN. For example, The Gun 6000 Series available from the assignee hereof provides a player with a high performance gun/ejector that a player and his or her coach can use during shooting practice. Other ball throwing devices are also available, such as the Dr. Dish™ product available from Airborne Athletics, Inc. of Belle Plaine, Minn., that are used during basketball practice.

One problem or deficiency of the prior art devices is that while they can be programmed to eject basketballs toward a player at a particular location, they were not capable of challenging the shooter's accuracy by, for example, making the shooter successfully shoot a number of shots, either consecutively or non-consecutively, at one location before the gun/ejector caused balls to be ejected or thrown to the next spot or location. Moreover, the devices fail to simulate a playing environment wherein a player feels pressure or a pressure-simulated is provided.

There is, therefore, a need for a system and method for improving the player's efficiency in shooting a basketball.

SUMMARY OF THE INVENTION

One object of an embodiment is to provide a system and process for improving a player's shooting ability.

Another object is to provide a system and method for challenging a shooter.

Still another object is to provide a system and method for monitoring a player's shooting performance, such as shots made in a row and/or total cumulative shots made.

In one aspect, this invention comprises a system for improving a player's efficiency in shooting a basketball toward a basketball hoop on a basketball backboard associated with a basketball playing area, the system comprising a basketball ejector for ejecting a basketball to a plurality of different locations on the basketball playing area, a sensor associated with the basketball hoop for sensing when a basketball goes through the basketball hoop, and a controller coupled to the basketball ejector and the sensor, the controller causing the basketball ejector to eject a predetermined number of balls to a player located at a first one of the plurality of different locations for a predetermined shooting challenge, and after the predetermined shooting challenge is met by the player shooting a number of balls that the sensor senses passing through the basketball hoop, the controller causes the basketball ejector to eject balls toward at least one second one of the plurality of different locations.

In another aspect, this invention comprises a method for improving a player's efficiency in shooting a basketball toward a basketball hoop on a basketball backboard associated with a basketball playing area, the method comprising the steps of enabling a user to select a predetermined shooting challenge having a predetermined number of different locations at which a player will shoot one or more basketballs, throwing a predetermined number of basketballs to a first one of the plurality of different locations at which the player can receive the basketball and shoot it towards the basketball hoop, sensing when a basketball goes through the basketball hoop, causing a basketball ejector to eject the predetermined number of basketballs to the player located at the first one of the plurality of different locations for a predetermined shooting challenge, and after the player achieves the predetermined shooting challenge, causing the basketball ejector to eject a second predetermined number of basketballs toward at least one second one of the plurality of different locations.

These and other objects and advantages of the invention will be apparent from the following description, the accompanying drawings and the appended claims.

BRIEF DESCRIPTION OF THE ACCOMPANYING DRAWINGS

Figure 1:
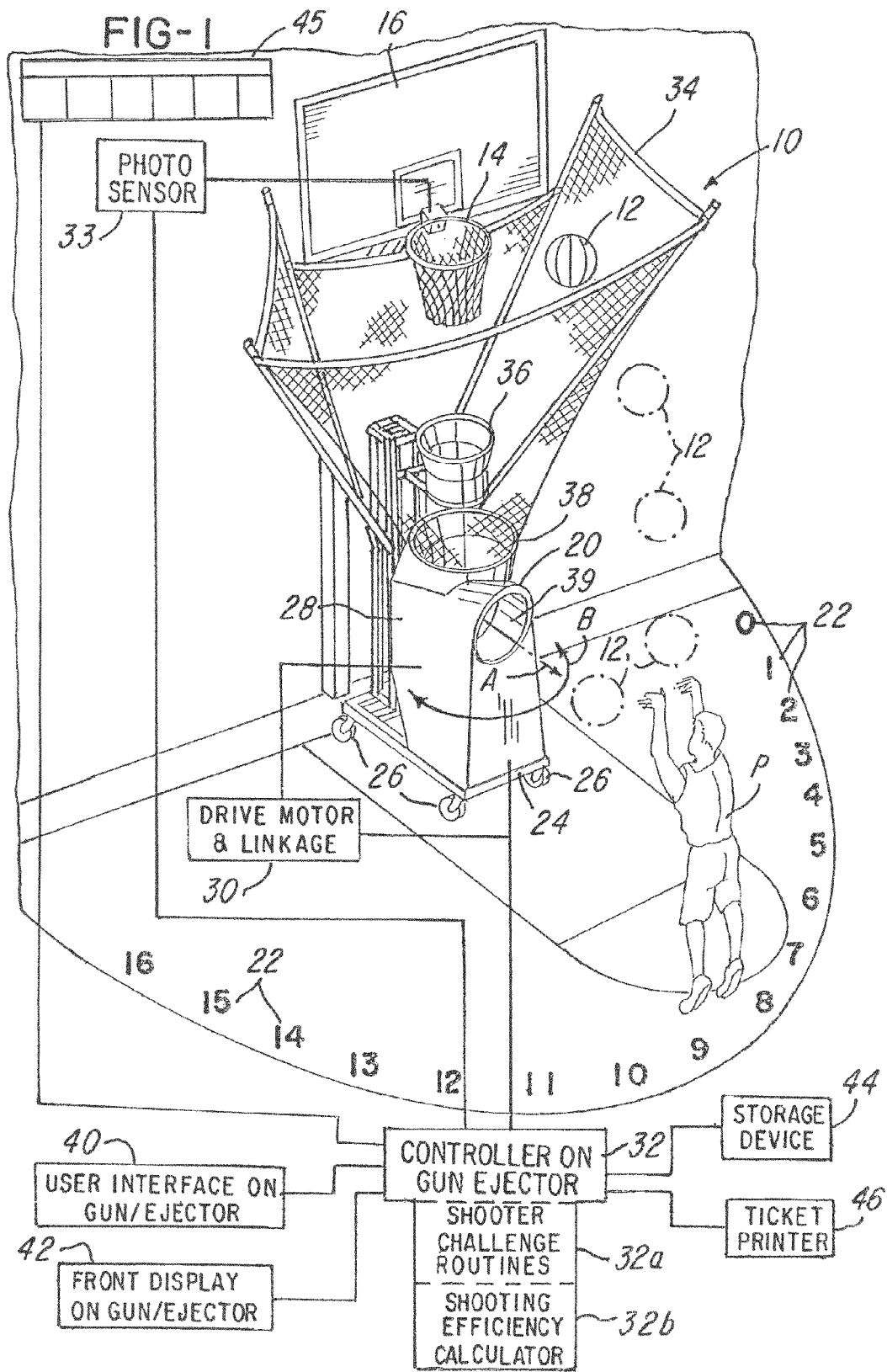
FIG. 1 is a perspective view of a system in accordance with one embodiment of the invention where a player is shooting a basketball from a first position at a playing area.
Figure 3:
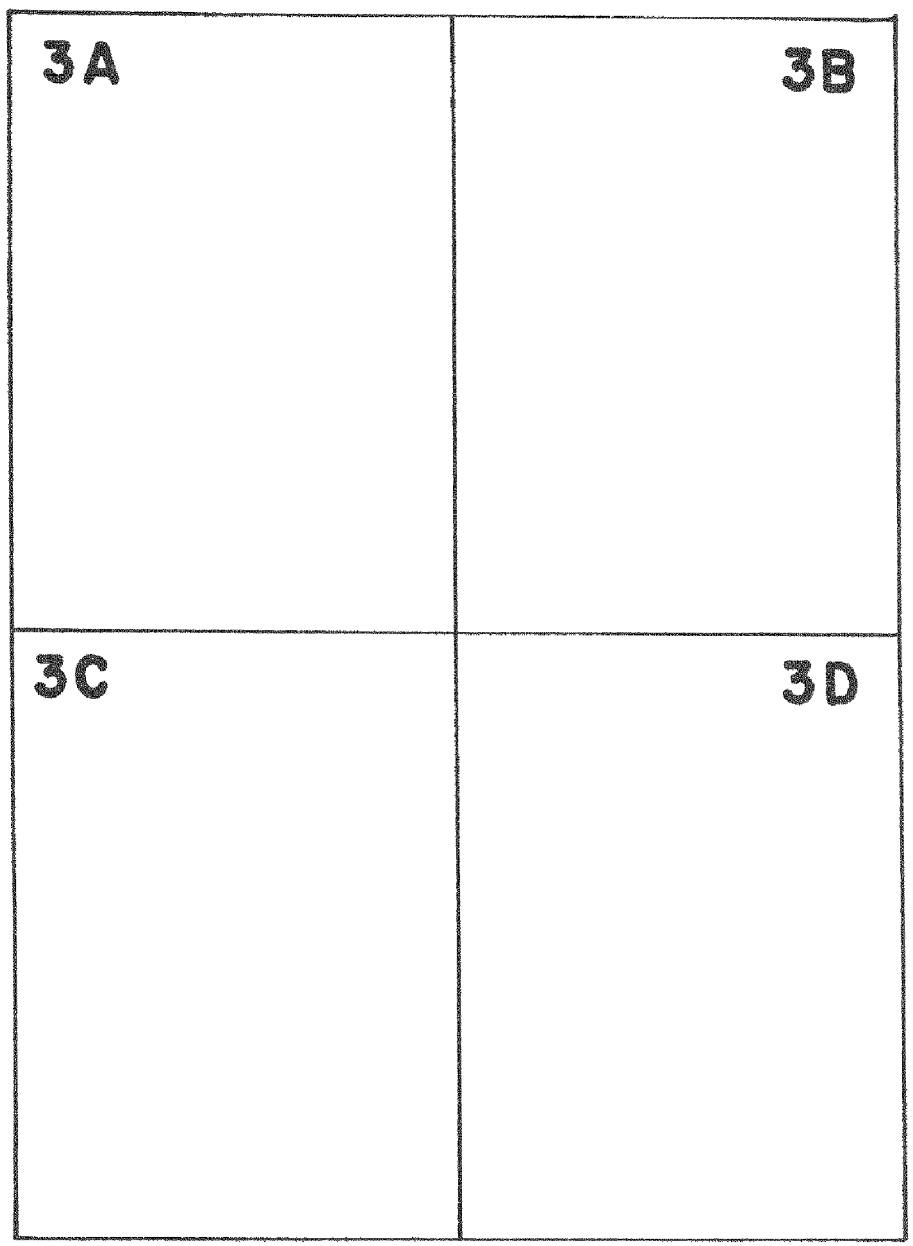
Figure 3A:
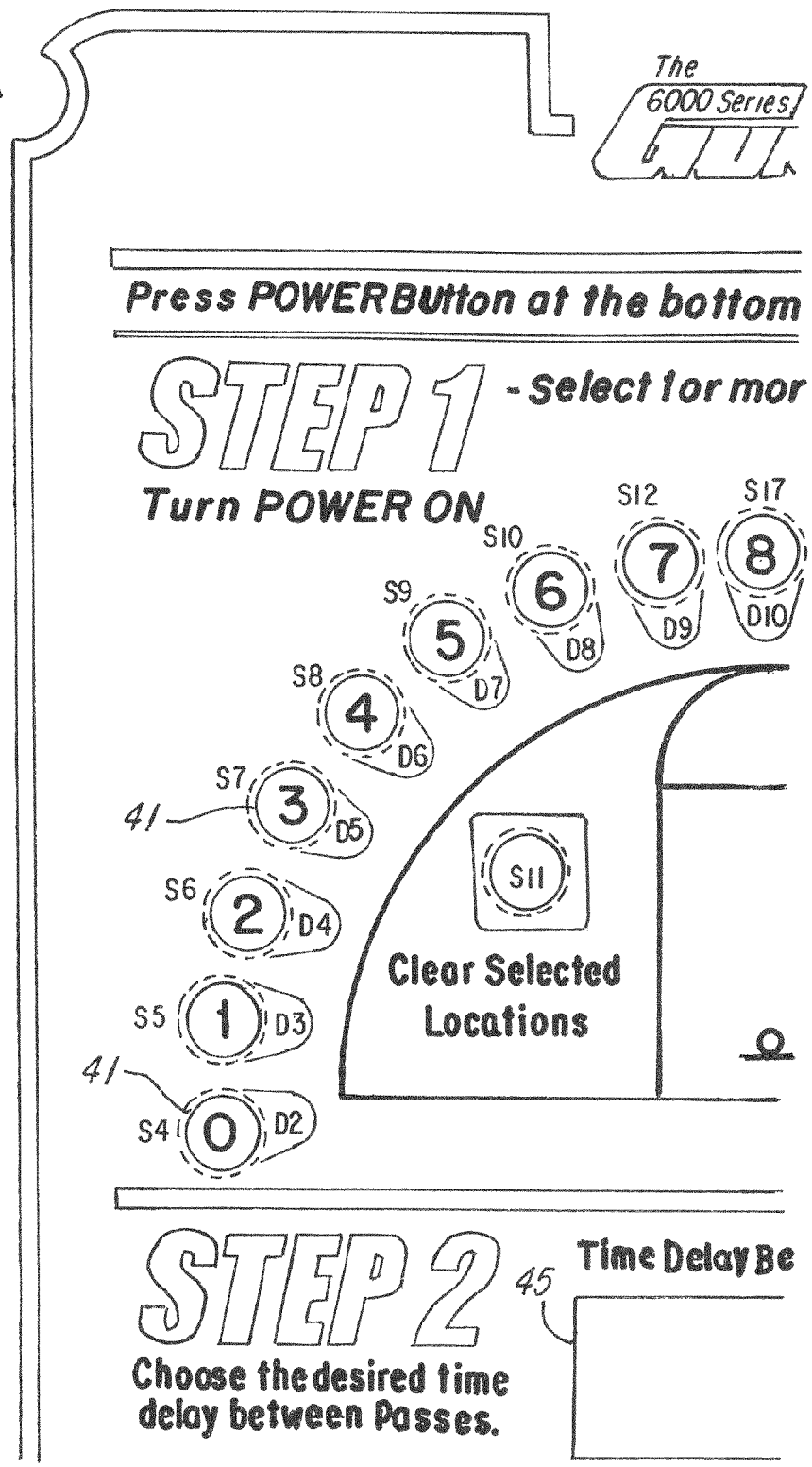
Figure 3C:
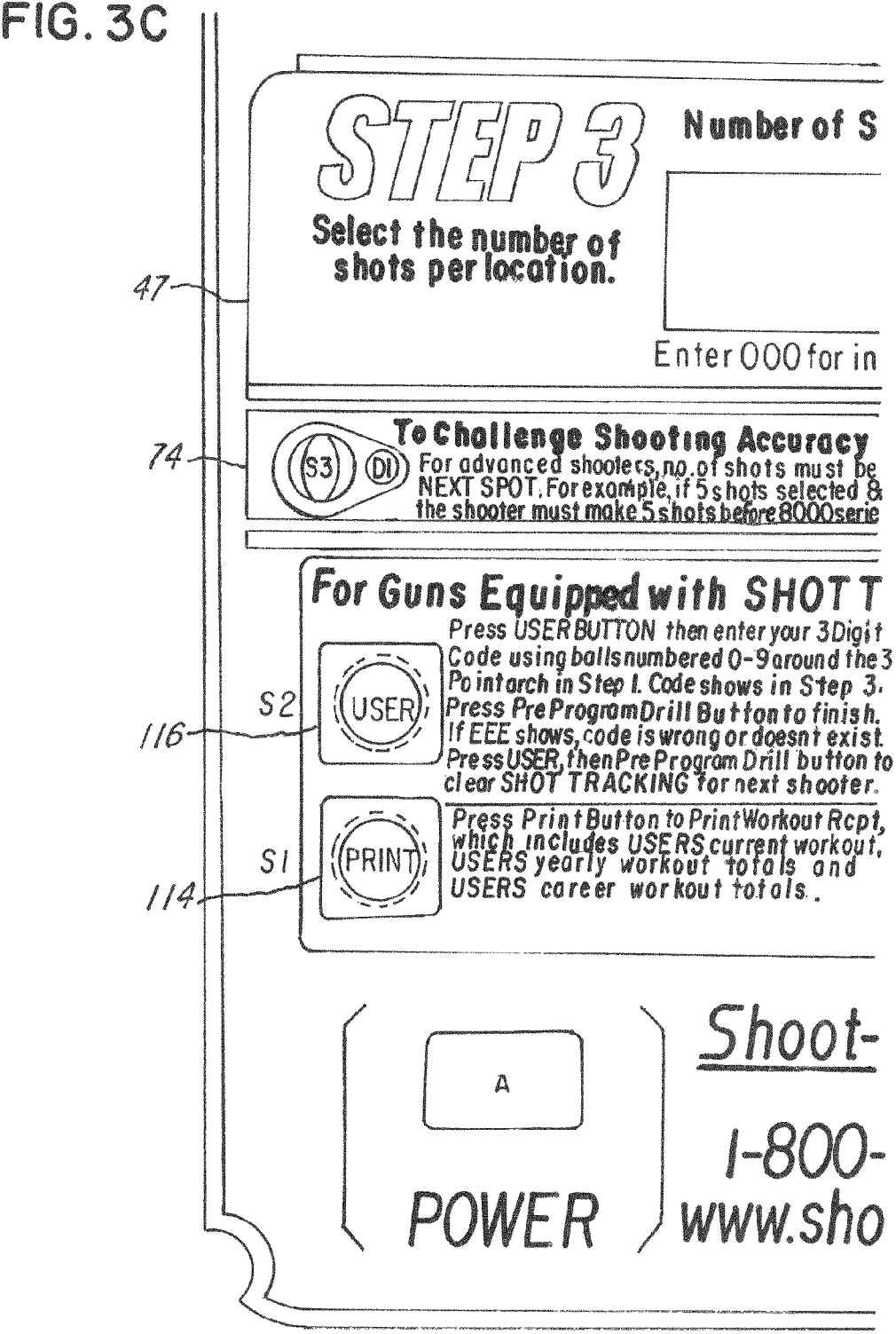
Figure 3D:
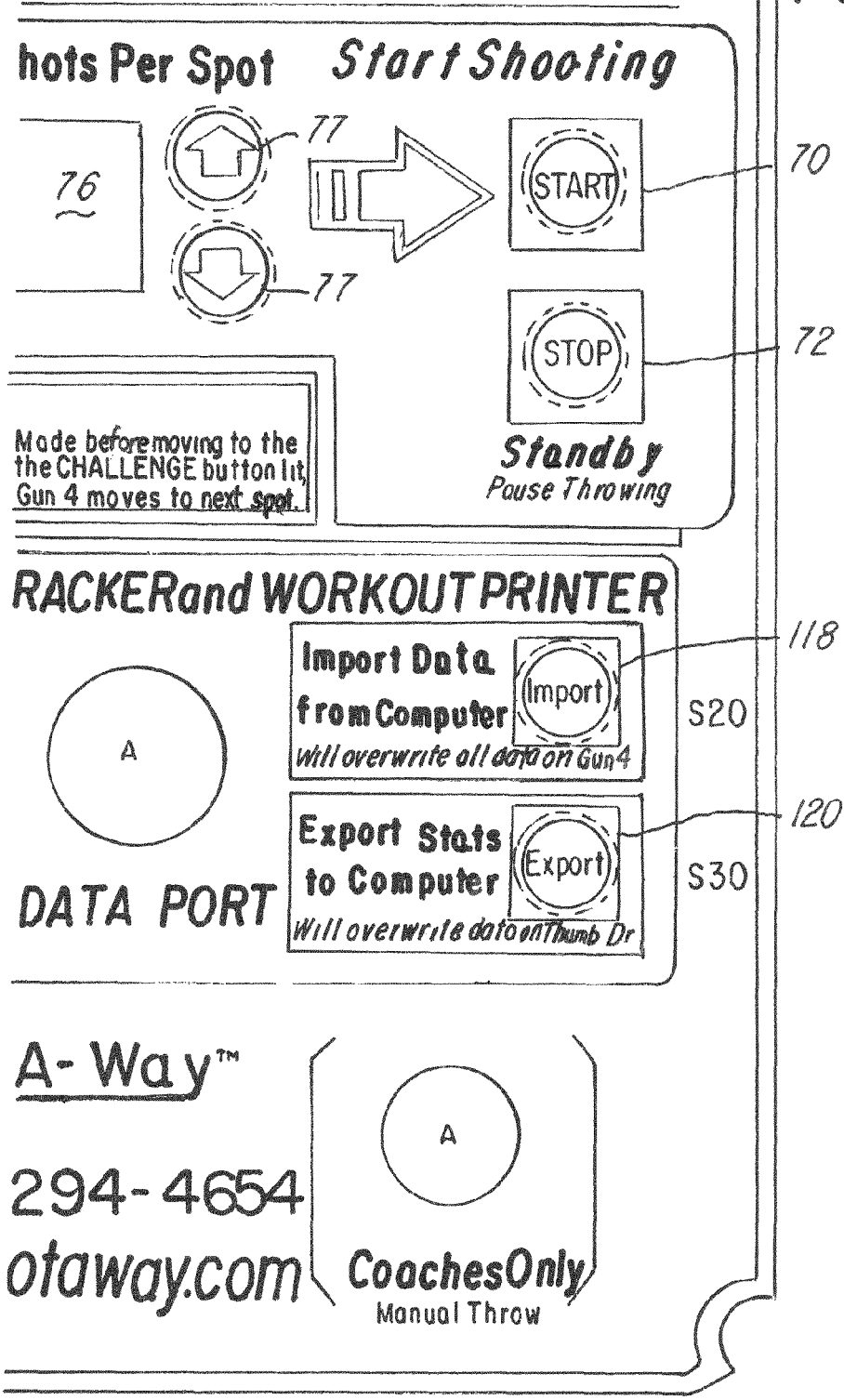
Figures 4, 5:
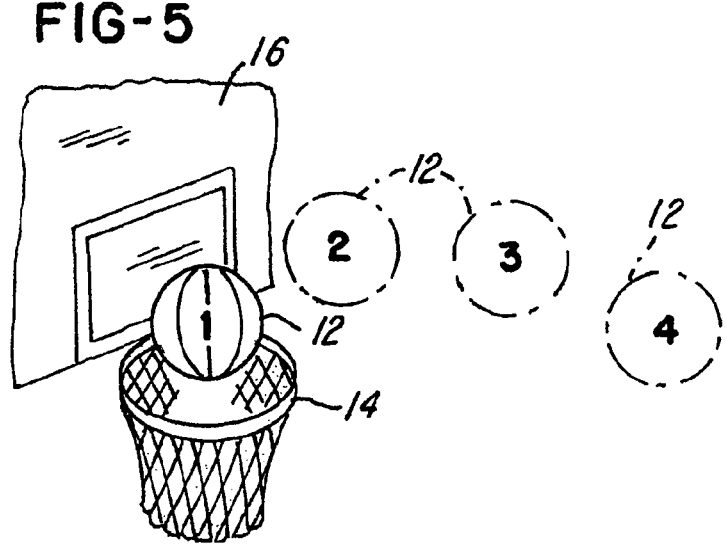
Figure 7:
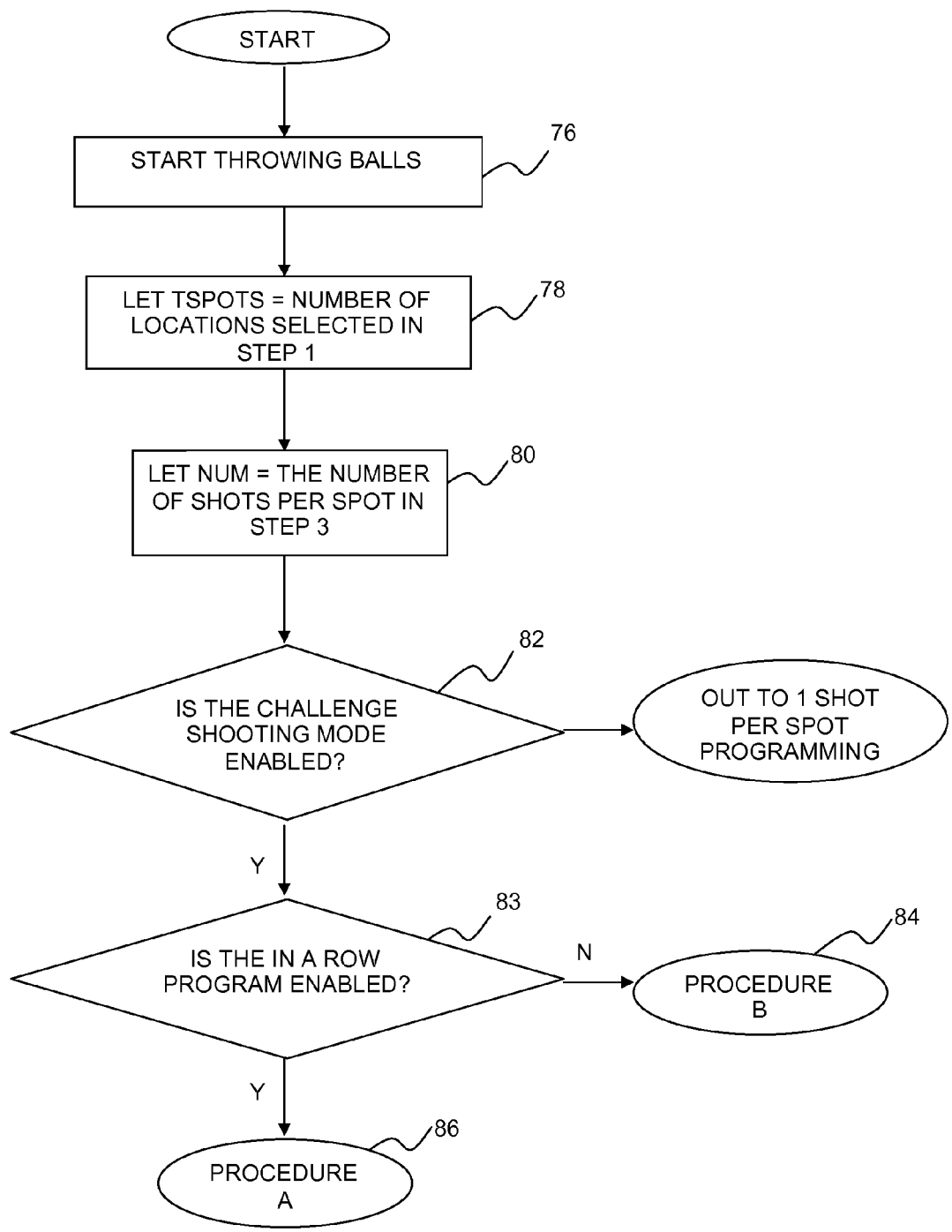
Figure 8:
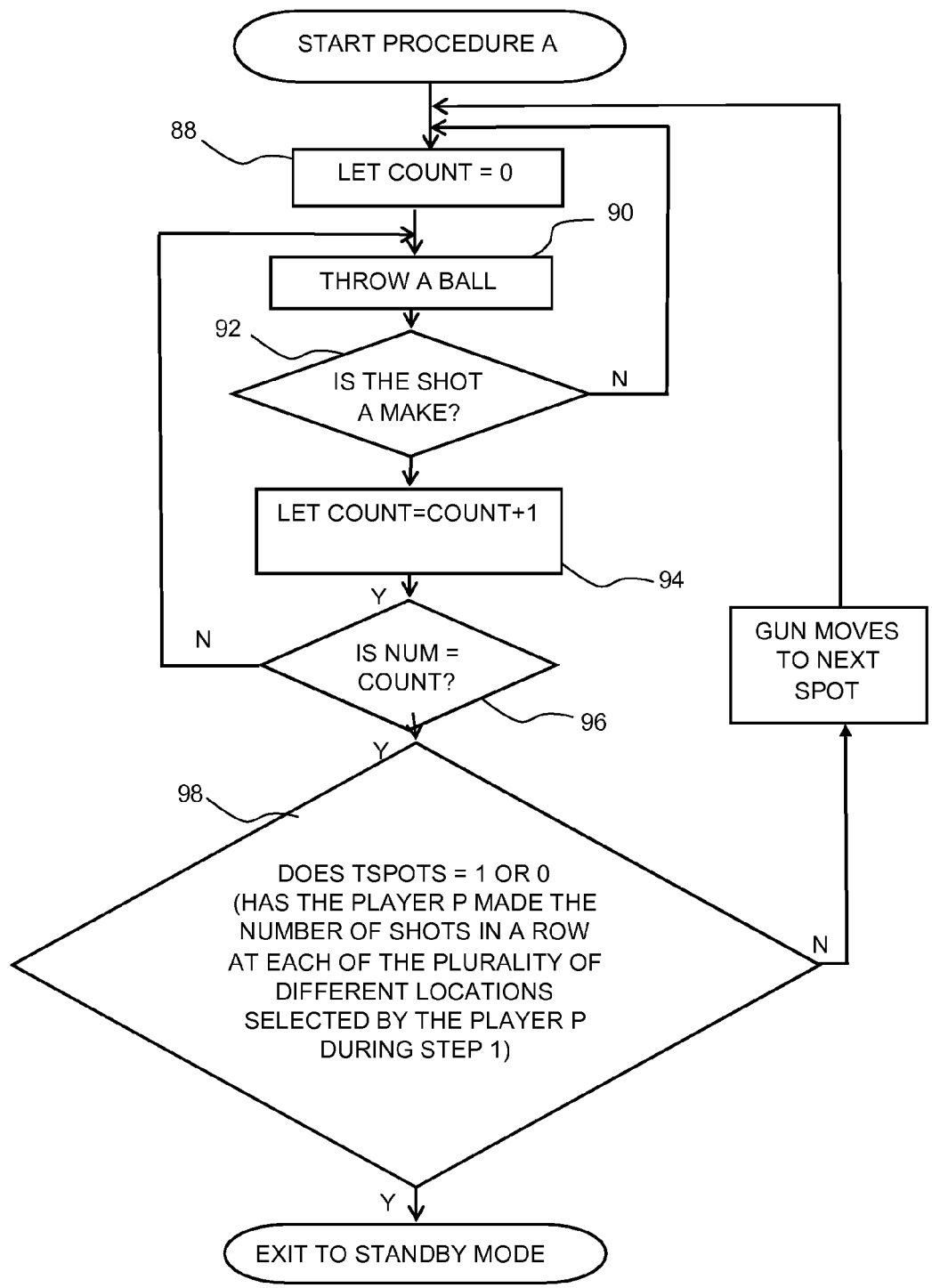
Figure 9:
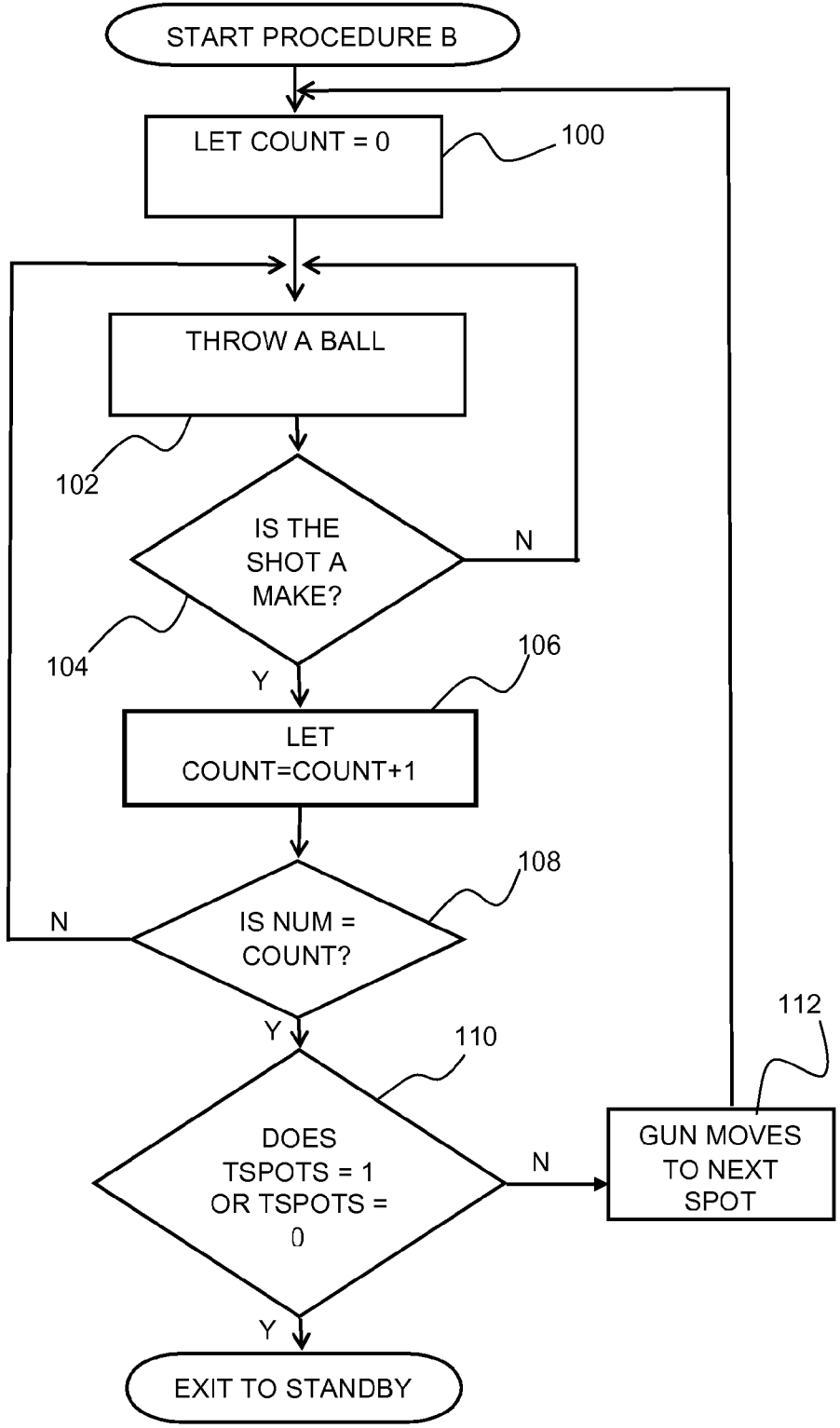

Please replace paragraph with the following amended paragraph:

FIGS. 3-3D are views of a user interface or display in accordance with one embodiment of the invention;

FIG. 4 is an enlarged view showing details of a display shown in FIG. 1;

FIG. 5 is a simplified view of a plurality of basketballs made in a row in the simplified illustration;

FIG. 6 is a view of various statistics and data and a printout for the player over a preselected period, illustrating the player's percentage of made shots relative to total shots at one or more of each of the plurality of different locations;

FIG. 7 is a schematic of a challenge shooting accuracy main procedure routine;

FIG. 8 is a schematic of a challenge shooting accuracy routine wherein multiple shots must be made in a row; and FIG. 9 is a schematic of a challenge shooting accuracy routine wherein multiple shots must be made at a particular location, but not necessarily in a row.

DETAILED DESCRIPTION OF THE PREFERRED EMBODIMENTS

Figure 2:
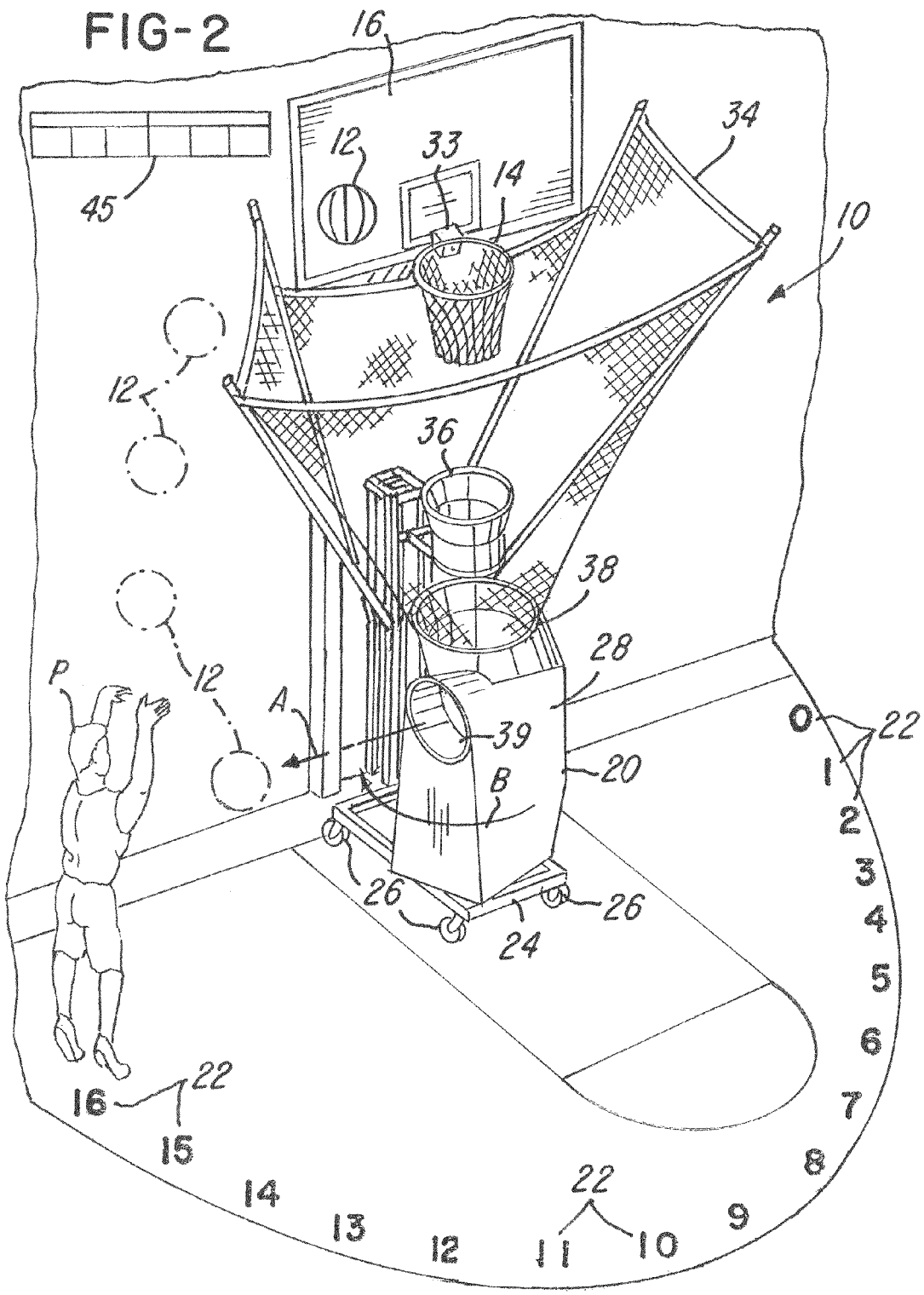
FIG. 2 is a view similar to FIG. 1 after the player has successfully performed one or more shooting accuracy routines at a first position (such as FIG. 9 and FIG. 1) and after a gun/ejector has automatically pivoted to eject or throw a basketball to another position, such as position 16 in the illustration.

Referring now to FIG. 1, a system 10 for improving a basketball player's efficiency in shooting basketball 12 toward a basketball hoop 14 on a basketball backboard 16 associated with a basketball playing area 18 is shown. The system 10 comprises a conventional basketball gun or ejector 20 that is capable of receiving a plurality of basketballs 12 and ejecting them toward a plurality of different areas, locations or positions 22 at the basketball playing area 18. For ease of illustration, the plurality of different areas 22 correspond to areas on the basketball playing area 18 and for ease of understanding, those positions 22 are labeled 0-16 in FIGS. 1 and 2. It should be appreciated that the gun/ejector 20 may be programmed to fire balls to more or fewer areas in a manner conventionally known.

The gun/ejector 20 is a conventional ball ejecting machine and comprises a frame 24 having a plurality of wheels 26. The gun/ejector 20 has a conventional ball ejector 28 that is pivotally mounted on the frame 24 and can throw or eject basketballs 12 in the direction A. The gun/ejector 20 comprises a drive motor and linkage 30 for pivotally driving the ball ejector 28 in the direction of double arrow B in FIG. 1 so that a direction of thrown balls can be changed. The system 10 comprises a circuit board (not shown) having the controller 32 that is coupled to and controls the operation of the drive motor and linkage 30, gun/ejector 20 as shown.

Note that the gun/ejector 20 also comprises a ball retrieval or net system 34 which facilitates gathering basketballs 12 that are thrown toward the hoop 14 in a manner conventionally known. As also illustrated the gun/ejector 20 may further comprise a shoot or guide 36 for facilitating guiding basketballs 12 into an inlet 38 where they can be ejected by the gun/ejector 20 through the outlet 39 and toward a basketball player P.

A photo sensor 33 is coupled to the hoop 14 and electronically coupled to the controller 32. The photo sensor 33 senses when the player P has successfully shot the basketball through the hoop 14.

In the embodiment being described several conventional guns/ejectors 20 may be used, including The Gun 6000 Series available from Shoot-a-Way, Inc. of Upper Sandusky, Ohio. An alternative gun/ejector 20 may be the Dr. Dish™ product available from Airborne Athletics, Inc. of Belle Plaine, Minn.

In the illustration being described, the controller 32 comprises a plurality of routines or algorithms for improving the player P's shooting efficiency. The routines include a shooter challenge routine 32a for challenging the player P in shooting a basketball 12 towards the at least one or a plurality of different areas 22. The shooter challenge routine 32a facilitates improving a player's efficiency in that they provide a player P with feedback as to his or her shooting accuracy. With the feedback, the player P can focus his or her shooting practice on those areas where the player's efficiency is below a predetermined or preselected efficiency percentage. In the illustration being described, the predetermined efficiency may be any desired or selected shooting efficiency, such as 30% or 40%. For example, if a player's shooting efficiency falls below the predetermined threshold, such as 40% in the illustration being described, the player P may forces his or her practice on the areas where the player P needs to improve his or her shooting efficiency.

Referring back to FIG. 1, the controller 32 further comprises means or apparatus for calculating the shooting efficiency using a shooting efficiency calculator 32b. The shooting efficiency calculator 32b calculates a shooting efficiency of the player P at the at least one or a plurality of the plurality of different positions 22 where the player P shot the basketball 12. The shooting efficiency calculator 32b may provide shooting efficiency statistics and data during one or more of the shooter challenge routines 32a mentioned later herein, but it is also capable of providing historical or cumulative data regarding a player's lifetime or career shooting statistics at each of the plurality of different locations 22. Again, the player P or a coach (not shown) may use the information, statistics or data as feedback in order to improve the player's efficiency in shooting the basketball 12 at the one or more of the plurality of different locations 22.

Referring back to FIG. 1, the system 10 comprises a user interface 40 and a front display 42. The user interface 40 in the illustration being described is shown in more detail in Figs. 3A-3D and will be described later herein. For ease of illustration, FIG. 3 illustrates the interface 40 with various portions of the interface shown in FIGS. 3B-3D. The system 10 further comprises a storage device 44, such as an electronic storage device or other electronic storage, for storing data relative to the player's efficiency, such as data regarding the player's performance during one or more of the shooter challenge routines 32a and even historical or cumulative information regarding a player's performance over a predetermined period or even a player's career in shooting using the system 10.

As further illustrated in FIG. 1, the system 10 further comprises a ticket printer 46 which is coupled to the controller 32 and which is capable of printing a ticket 48 (FIG. 6). In the illustration being described, the ticket 48 comprises a plurality of information fields 50. In the illustration being described, the information fields 50 may include a player's name 52, time and date or period the player P practiced which could be a single day or date or could be a date span over a period of time during which the player P used the system 10. Note in the illustration being described, the ticket 48 comprises information fields 50 that also include information relevant to the player P's shooting performance. In the illustration being described, the ticket 48 comprises a spot column 55 which identifies the at least one or a plurality of predetermined locations 22 at which the player P shot the basketball 12. A total shots column 56 which identifies the number of shots attempted at the associated spot listed in the spot column 55. The ticket 48 information fields 50 also comprises a number of shots made column 58. Finally, a percentage column 60 is provided so that a player P can view the percentage of shots made at a given spot relative to the total number of shots taken over the time period 54 selected by the player P.

As mentioned earlier, a predetermined or desired efficiency threshold, such as 40% in the illustration being described, may be selected. The player P can use the information fields 50, such as the percentage column 60, and identify those spots where the player P's shooting efficiency dropped below the predetermined or desired efficiency threshold. In the illustration shown in FIG. 6, note that the highlighted areas 62 each identify spots, such as spots 3, 10, 11, and 13, at which the player P's efficiency dropped below 40%. Using this information, the player P or his or her coach (not shown) may then program the controller 32 using the user interface 40 to direct one or more respected shots to those particular spots where the player P's efficiency dropped below the predetermined threshold. In a manner conventionally known, the player P may select a number of shots to shoot at the one or more of predetermined plurality of different locations 22 or alternatively, the player P may select initially or after reviewing his or her efficiency percentages to shoot a number of shots at each of the plurality of different locations 22 where the player P's performance efficiency was deficient using one or more of the shooter challenge routines 32a. These routines will not be described relative to FIGS. 7 - 9.

In the illustration being described, the shooter challenge routines 32a are programs stored in a read only memory (not shown) on the board (not shown) and under control of the controller 32.

Before beginning the shooter challenge routines 32a, the player P or the coach uses the interface 40 to program the controller 32. In this illustration, the controller 32 is programmed in multiple steps. First, the user selects one or more of the plurality of different locations 22 (0-16, in the illustration being described) during a first step or does not select a location thus the Gun will throw to the direction it is pointing. Note that the interface 40 may have the steps labeled for easy access. During a second step, the user programs the controller 32 and selects a time delay between passes or the time between which the gun/ejector 20 ejects basketballs 12. In one embodiment, the time delay is predetermined and set to at least one second. The third conventional step is programming the controller 32 with the number of shots for each of the plurality of different locations 22 selected in Step 1. Again, the player P can start the shooting by pressing the start button 70 and can stop shooting by pressing the stop button 72.

The player P or a coach may select a challenge shooting accuracy button 74 Figs. 3A-3D) whereupon the controller 32 will begin the shooter challenge routines 32a. A multiple shots in a row routine requires the player P to make the number of shots consecutively before the gun/ejector 20 is caused to throw basketballs 12 at the next programmed spot. A total number of shots routine requires the player P to make the total number of shots before the gun/ejector 20 begins throwing basketballs 12 at the next programmed spot. During this routine, the player P does not have to make the number of shots consecutively. In this regard, if the player P selects the challenge shooting accuracy button 74, then the controller 32 prompts the user using the screen 76 to determine whether the player P desires to make multiple shots in a row or multiple shots at each spot before the gun/ejector 20 is caused to pivot and throw basketballs 12 to the next position, without the requirement that the shots be made in a row.

A main routine will now be described. If the challenge shooter accuracy button 74 is not pressed and the player P or his or her coach presses the start button 70, the controller 32 begins at block 78 (FIG. 7) by starting to throw basketballs 12 toward the player P at one of the plurality of different locations 22 as selected by the player P during step 1 (Figs. 3A-3 D). The routine continues to block 79 where the controller 32 assigns a TSPOTS variable to the number of locations selected in step 1. The routine continues to block 80 where the controller 32 assigns a NUM variable to the number of shots per spot selected by the player P in step 3. At decision block 82, it is determined whether the challenge shooting mode was enabled by the player P by pressing button 74 (Figs. 3A-3D). If it was not, then the controller 32 energizes the gun/ejector 20 to output one shot for each spot selected by the player P. If a decision at block 80 was affirmative, then it is determined whether the player P selected the multiple shots must be made in a row routine where the player P must make the selected number of shots in a row at each of the plurality of different locations 22 selected by the player P in step 1. If the decision at block 82 was negative, then the routine continues to the multiple shots which must be made at one or each of the plurality of different locations 22 selected by the player P in step 1 which is illustrated in FIG. 9. If the decision at decision block 82 was affirmative, then the routine continues to the multiple shots which must be made in a row at the at least one or each of the plurality of different locations 22 selected by the player P in step 1, which is illustrated in FIG. 8 and which will now be described.

If the player P selected challenge shooter accuracy routine in which the player P must make multiple shots in a row at the least one or a plurality of different locations 22 selected by the player P, then the controller 32 begins the routine illustrated in FIG. 8 (block 88) and the routine continues to block 90 where the controller 32 energizes the gun/ejector 20 to throw a basketball 12 toward the first spot selected by the player P during step 1.

The photo sensor 33 senses when a basketball 12 passes through the hoop 14 (FIG. 5) and therefore when a shot by a player P has been made. At decision block 92 (FIG. 8), the photo sensor 33 determines whether the shot was made by the player P and if it was not then the routine loops back to block 88 as shown. If the shot was made, the controller 32 increments the count by one (block 94) and it is determined at decision block 96 whether or not the total number, which is the number that the player P has programmed during step 3 using the interface 40. It should be understood that if the player P has selected the challenge shooting accuracy button 74 and been prompted to enter during step 3 the number of shots that must be made in a row using the buttons 77 (FIG. 3), with the total number of shots displayed in the display 76. If the controller 32 determines that the total number of shots made, as represented by the COUNT variable, is equal to the predetermined number of shots to be made as selected by the player P at decision block 96, then the routine continues to decision block 98, otherwise it loops back to block 90 as shown.

Thereafter, the controller 32 determines whether or not the total number of spots (TSPOTS) equals one or zero. If the decision at decision block 98 is negative, then the player P has made the number of shots in a row at the location which the player P is shooting the ball, so the controller 32 energizes drive motor and linkage 30 to pivotally drive the gun/ejector 20 so that it will eject basketballs 12 toward the next spot which was selected by the player P in step 1. If the decision at decision block 98 if affirmative then the routine exits to a standby mode as shown.

Another shooter challenge routine 32a may be selected by the player P as mentioned earlier. During this routine, a player must shoot multiple shots at the at least one or at each of the plurality of different locations 22 that are selected by the player P, without the limitation or qualification that the shots be made in a row. If this shooter challenge routine 32a is selected, controller 32 starts the routine in FIG. 9 wherein it sets a COUNT equal to zero at block 100. The controller 32 energizes the gun/ejector 20 to throw a basketball 12 toward the first of the at least one or a plurality of the plurality of different locations 22 selected by the player P at block 102. At decision block 104, it is determined whether the shot is made and if it is not it loops back to block 102 as shown. If the shot is made, the controller 32 increments the COUNT by one (block 106) and then proceeds to decision block 108 where it is determined whether the total number of shots made is equal to the COUNT. If it is not, then the routine loops back to block 102 where another basketball 12 is thrown. If the decision at decision at block 108 is affirmative, then the routine proceeds to decision block 110 where it is determined if the TSPOTS equals one or is TSPOTS equals zero. Thus, it is determined at decision block 110 if TSPOTS equals one or is TSPOTS equals zero which signify that player P has only selected one spot or the direction the gun/ejector 20 is currently pointing (zero spots) to shoot his number of makes at this spot (i.e. there is no other locations selected so the gun goes in standby mode). If it is not, then the controller 32 energizes the drive motor and linkage 30 to pivotally drive the gun/ejector 20 so that it throws a basketball 12 to the next spot selected by the player P at block 112 and the routine then proceeds back to block 100 as shown. If the decision at decision block 110 is affirmative, then the routine exits as shown.

After the player P has used the system 10, it may output the shooting efficiency statistics to the ticket printer 46 by selecting the print button. The user can display shooting statistics either by the ticket printer or by exporting them to a secondary device like a computer and see them there.

In the illustration being described, the controller 32 may be programmed with one or more player's names, such as the players P on any given team and their information stored in the electronic storage device 44. When a particular player P is using the system 10 he can retrieve his user information using the user button 116 (FIG. 3) which the controller 32 will cause a directory of players to be displayed so that the user can select the player P that will be using the system 10. In one illustration, each player will have a 3 digit code tied to his name which will be initially set up on a computer and dropped down on the gun/ejector 20 by an import button 118 (FIG. 3). When player P wants to use the system 10, he will enter his three digit code. This code will be displayed on the front scoreboard display 45 (FIGS. 1 and 4) when the system 10 is in standby mode and for a set time, such as at least 4 seconds, in the STEP 3 (76 in FIG. 3) three digit display. Although not shown, the system 10 may include the ability to load/enter the shooter' number or name at the gun/ejector 20 and have it displayed on the front board and/or on the control board, thus not having to import it from a computer. The statistics relative to a player P may also be imported and stored using the button 118, which a coach uses to load players into the system each tagged with a 3 digit code or if the coach has too edit a certain players shooting data on a given workout. Moreover, the user can export data associated with one or more players P using the export stats button 120. In this regard, the controller 32 may have an input/output interface that enables, for example connection to permanent or portable storage devices, such as CD, DVD, USB interface for smart drives, flash drives and the like. The information can then be loaded onto other computers (not shown) for evaluation and use by other users, such as coaches, trainers and the like.

During use of the system 10, it may be desirable to provide a display 45 (Figs. 1 and 3A-3D) which can be wired or wireless and in communication with the controller 32 so as to enable a player P or his or her coach to view the performance and efficiency during the player P's use of the system 10.

In general, the system 10 comprises the user interface 40 that enables the user to select the shooting practice that the user desires. During the first step, the user turns the power to the gun/ejector 20 and the controller 32 on and selects either the preprogrammed drills or the user can select at least one or a plurality of different locations 22 at which the player P will shoot the basketball 12. In the illustration being described, for example, the user would select the various positions by depressing one or more of the buttons 41 which are arranged on the interface 40 to generally correspond to the positions 22 labeled in FIG. 1. The controller 32 receives the selected positions information and stores it in memory (not shown). During a second step, labeled as step 2 on the user interface 40, the user selects the time delay between passes using the buttons 43 and display 45. The time delay represents the amount of time that the gun/ejector 20 allows to lapse before ejecting basketballs 12.

During the third step, the user uses the button 77 and display 47 to select the number of shots at each of the locations selected during step 1. The user may begin a practice by depressing the start button 70 and may end the practice by depressing the stop button 72.

During this third step, the user may also elect to challenge the shooting accuracy 74. The shooter challenge routines 32a are stored in the electronic storage device 44. It should be understood that the shooter challenge routines 32a facilitate improving the player P's shooting efficiency by providing a number of shooting challenges to the player P at one or more of the plurality of different locations 22. By challenging the shooter accuracy and then evaluating a shooter's statistics during the challenges, the shooter's performance can be evaluated. If the shooter's shooting efficiency is below a predetermined threshold or is deficient as determined by the player P or his or her coach, then during the player P's next shooting practice the player P can use the information and program the system 10 to throw basketballs 12 at one or more of the plurality of different locations 22 where the player P's performance was deficient, thereby improving the player P's shooting accuracy in general and also improving the player P's accuracy at one or more of the plurality of different locations 22.

Advantageously, this system 10 and method provide means for improving the player P's efficiency at shooting the basketball 12 at one or more of the plurality of different locations 22.

The system and method enables a player to select S number of shots and N number of positions at which the player will shoot at lease one basketball.

The system and method further permits repeating the throwing, sensing and causing steps until the player has shot S number of shots at each of N number of position, wherein S is at least one of a total number of shots made at each of N number of positions or a total number of shots made in a row at each of N number of positions.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A system for improving a player's efficiency in shooting a basketball toward a basketball hoop on a basketball backboard associated with a basketball playing area, said system comprising:
   a basketball ejector for ejecting basketballs to a plurality of predetermined different locations on the basketball playing area, said basketball ejector comprising a ball ejector coupled to a motor for driving said basketball ejector;
   a sensor associated with said basketball hoop for sensing when a basketball goes through said basketball hoop;
   an interface having a plurality of buttons arranged to generally correspond to the plurality of predetermined different locations on the basketball playing area, said plurality of predetermined different locations being different angular shooting positions on the basketball playing area at which said basketball elector is adapted to throw basketballs on the basketball playing area, said plurality of buttons being spaced angularly on said interface, with each one of said plurality of buttons corresponding to one of said different angular shooting positions, respectively; and
   a controller coupled to said interface, said motor, said basketball ejector and said sensor:
   said interface further comprising:
      at least one shots button for programming said controller with a number of shots to be made or number of shots to be made in a row during a predetermined shooting challenge, said predetermined shooting challenge comprising at least one of a total number of shots made at each of said plurality of predetermined different locations challenge or a total number of shots made in a row at each of said plurality of predetermined different locations challenge:
      at least one shooting challenge button for selecting said at least one of said total number of shots made at each of said plurality of predetermined different locations challenge or said total number of shots made in a row at each of said plurality of predetermined different locations challenge;
      said controller being programmed in response to a user selecting or actuating:

a first one of said plurality of buttons corresponding to a first one of said plurality of predetermined different locations, by selecting at least one second one of said plurality of buttons corresponding to at least one second one of said plurality of predetermined different locations;

said at least one shots button to program said number of shots to be made or number of shots to be made in a row during said predetermined shooting challenge;

said at least one shooting challenge button to select at least one of said total number of shots made at each of said plurality of predetermined different locations challenge or said total number of shots made in a row at each of said plurality of predetermined different locations challenge;

after said programming of said controller using said interface, said controller causes said basketball ejector to eject or pass basketballs to a player located at said first one of said plurality of predetermined different locations for said predetermined shooting challenge, and after said predetermined shooting challenge is met by said player either making said number of shots to be made or making said number of shots to be made in a row, as sensed by said sensor sensing a shot basketball passing through said basketball hoop, said controller energizes said basketball ejector to cause said basketball ejector to cease ejecting or passing basketballs to said first one of said plurality of predetermined different locations where said predetermined shooting challenge was met and further energizes said motor to pivot or move said ball ejector and energize said basketball elector to cause basketballs to be elected or passed to said at least one second one of said plurality of predetermined different locations, whereupon said player may again perform the predetermined shooting challenge at said at least one second one of said plurality of predetermined different locations;

said first one of said plurality of predetermined different locations and said at least one second one of said plurality of predetermined different locations on said basketball playing area corresponding to said first one of said plurality of buttons and said second one of said plurality of buttons, respectively, on said interface that were actuated or selected.

2. The system as recited in claim 1 wherein said predetermined shooting challenge is said total number of made shots challenge and said controller causes said basketball ejector to eject basketballs to the player at said at least one second one of said plurality of predetermined different locations only after said player makes a predetermined number of total shots at said first one of said plurality of predetermined different locations.

3. The system as recited in claim 2 wherein said controller causes said basketball ejector to delay ejecting a basketball to said at least one second one of said plurality of predetermined different locations a predetermined delay time when the player has made said predetermined number of total shots less one.

4. The system as recited in claim 3 wherein said predetermined delay time is at least 1 second.

5. The system as recited in claim 1 wherein said predetermined shooting challenge is a total number of made shots in a row challenge and said controller causes said basketball ejector to eject a predetermined number of balls to the player at said at least one second one of said plurality of predetermined different locations only after said player has made a predetermined number of shots in a row at said first one of said plurality of predetermined different locations, said interface further comprising a total number of made shots made in a row button for selecting said total number of shots made in a row challenge.

6. The system as recited in claim 1 wherein said user interface comprises a shooting challenge button for each of said total number of made shots at each of said plurality of predetermined different locations challenge and said total number of made shots in a row at each of said plurality of predetermined different locations challenge.

7. The system as recited in claim 1 wherein said system comprises at least one storage device coupled to said controller for storing data associated with the player's performance during said predetermined shooting challenge, said controller further comprising a shooting efficiency calculator for calculating the player's shooting efficiency during said predetermined shooting challenge using said data.

8. The system as recited in claim 1 wherein said system comprises at least one storage device coupled to said controller for storing data associated with the player's performance during said predetermined shooting challenge, said controller further comprising a shooting efficiency calculator for calculating the player's shooting efficiency using said data.

9. The system as recited in claim 8 wherein said shooting efficiency calculator calculates said player's shooting efficiency for each of said first one of said plurality of predetermined different locations and said at least one second one of said plurality of predetermined different locations.

10. The system as recited in claim 8 wherein said shooting efficiency calculator calculates said player's cumulative shooting efficiency for each of said first one of said plurality of predetermined different locations and said at least one second one of said plurality of predetermined different locations over the player's cumulative total number of attempts for each of said first one of said plurality of predetermined different locations and said at least one second one of said plurality of predetermined different locations.

11. The system as recited in claim 8 wherein said shooting efficiency calculator calculates the player's cumulative shooting efficiency at each of said plurality of different locations for all attempts the player has made at each of said plurality of predetermined different locations.

12. The system as recited in claim 8 wherein said system comprises a printer for printing said player's shooting efficiency.

13. The system as recited in claim 12 wherein said printer prints a ticket of said player's shooting efficiency.

14. The system as recited in claim 8 wherein said player's shooting efficiency comprises a completion percentage calculated by the total number of shots the player has made over the total number of shots the player has attempted during said predetermined shooting challenge.

15. The system as recited in claim 8 wherein said player's shooting efficiency comprises a completion percentage calculated by the total number of shots the player has made over the total number of shots the player has attempted during all times said player performed said predetermined shooting challenge.

16. The system as recited in claim 1 wherein said plurality of buttons are arranged in an arc on said interface.

17. The system as recited in claim 1 wherein said interface further comprises a delay button for selecting the delay time, with each of said plurality of buttons, said at least one shots button, said at least one shooting challenge button and said delay button being visible on the interface to the user.

18. A method for improving a player's efficiency in shooting a basketball toward a basketball hoop on a basketball backboard associated with a basketball playing area, said method comprising the steps of:

actuating a first button and at least one second button on an interface to select a plurality of predetermined different locations on the basketball playing area at which basketballs will be thrown during a predetermined shooting challenge, said predetermined shooting challenge comprising at least one of a total number of shots made at each of said plurality of predetermined different locations challenge or a total number of shots made in a row at each of said plurality of predetermined different locations challenge, said plurality of predetermined different locations being a plurality of different angular shooting positions on the basketball playing area at which a basketball ejector is adapted to throw basketballs on the basketball playing area, said first button and said at least one second button being selected from a plurality of buttons spaced angularly on said interface and corresponding to said plurality of different angular shooting positions, respectively, on the basketball playing area;

actuating at least one shots button on said interface for programming a controller with a number of shots during a predetermined shooting challenge; and actuating at least one shooting challenge button on said interface to select at least one of said at least one of a total number of shots made at each of said plurality of predetermined different locations challenge or said total number of shots made in a row at each of said plurality of predetermined different locations challenge;

said controller being programmed in response to said actuating steps and after said programming of said controller, said controller causes said basketball ejector to eject or pass basketballs to a player located at a first one of said plurality of predetermined different locations for said predetermined shooting challenge selected, and after said predetermined shooting challenge is met by said player making a made number of basketball shots that a sensor senses as having passed through said basketball hoop, said controller causes said basketball ejector to cease ejecting or passing basketballs to said first one of said plurality of predetermined different locations and to pivot or move said basketball ejector to a different position to change a direction of ejected or passed basketballs from said first one of said plurality of predetermined different locations where said predetermined shooting challenge was met to a second position in order to cause said basketball ejector to eject or pass basketballs to said at least one second one of said plurality of predetermined different locations, whereupon said player may again perform the predetermined shooting challenge at said at least one second one of said plurality of predetermined different locations;

said first one of said plurality of predetermined different locations and said at least one second one of said plurality of predetermined different locations being different angular positions on said basketball playing area that correspond to different angular positions of said first button and said at least one second button on said interface;

calculating shooting efficiency statistics for each of said first of said plurality of predetermined different locations said at least one second one of said plurality of predetermined different locations;

storing said shooting efficiency statistics onto at least one computer for evaluation and use by the player or other users; and using said interface to program said controller to perform said predetermined shooting challenge at an improvement location selected in response to said shooting efficiency statistics in order to try to improve the player's shooting ability.

19. The method as recited in claim 18 wherein said predetermined shooting challenge is a total number of made shots challenge, said method further comprising the step of:

causing said basketball ejector to eject a second predetermined number of basketballs to the player located at said at least one second one of said plurality of predetermined different locations for the same predetermined shooting challenge only after said player makes a predetermined number of total shots at said first one of said plurality of predetermined different locations.

20. The method as recited in claim 19 wherein said ejecting step comprises the step of:

delaying ejecting of the basketball to be shot during a predetermined shooting challenge to said at least one second one of said plurality of predetermined different locations a predetermined delay time when the player has made said predetermined number of total shots less one.

21. The method as recited in claim 20 wherein said predetermined delay time is at least 1 second.

22. The method as recited in claim 18 wherein said predetermined shooting challenge is a total number of shots made in a row challenge, said method further comprising the step of:

causing said basketball ejector to eject a predetermined number of balls to the player located at said at least one second one of said plurality of predetermined different locations only after said player has made a predetermined number of shots in a row at said first one of said plurality of predetermined different locations.

23. The method as recited in claim 18 wherein said method comprises the step of:

providing a user interface for selecting said predetermined shooting challenge; wherein said predetermined shooting challenge is at least one of a total number of made shots challenge at each of said plurality of predetermined different locations or a total number of made shots in a row challenge at each of said plurality of predetermined different locations.

24. The method as recited in claim 18 wherein said method comprises the steps of:

providing at least one storage device for storing data associated with the player's performance during said predetermined shooting challenge;

calculating the player's shooting efficiency at each of said plurality of predetermined different locations.

25. The method as recited in claim 18 wherein said method comprises the step of:

enabling the player to store data associated with the player's performance and calculate the player's shooting efficiency for said predetermined shooting challenge using said data.

26. The method as recited in claim 25 wherein said method further comprises the step of:

calculating the player's shooting efficiency at each of said plurality of predetermined different locations for said predetermined shooting challenge.

27. The method as recited in claim 26 wherein said method further comprises the step of:

calculating the player's cumulative shooting efficiency at each of said plurality of predetermined different locations for a cumulative number of attempts that the player has made at each of said plurality of predetermined different locations.

28. The method as recited in claim 26 wherein said method further comprises the step of:
providing a printer for printing said player's shooting efficiency.

29. The method as recited in claim 18 wherein said method further comprises the step of:
printing a ticket of said player's shooting efficiency.

30. The method as recited in claim 26 wherein said player's shooting efficiency comprises a completion percentage calculated by the total number of shots the player has made over the total number of shots the player has attempted during said predetermined shooting challenge.

31. The method as recited in claim 26 wherein said player's shooting efficiency comprises a completion percentage calculated by the total number of shots the player has made over the total number of shots the player has attempted during all times said player performed said predetermined shooting challenge.

32. The method as recited in claim 18 wherein said method further comprises the step of:
enabling a user to select S number of shots and N number of positions at which the player will shoot at least one basketball;
repeating said throwing, sensing and causing steps until the player has shot S number of shots at each of N number of positions, wherein said S is at least one of a total number of shots made at each of said N number of positions or a total number of shots made in a row at each of said N number of positions.

33. The method as recited in claim 18 wherein said method further comprises the step of:
determining the player's shooting efficiency for at least one of said plurality of predetermined different locations.

34. The method as recited in claim 18 wherein said method further comprises the step of:
determining the player's shooting efficiency for at least one of said plurality of predetermined different locations.

35. The method as recited in claim 34 wherein said method further comprises the step of:
comparing the player's shooting efficiency determined in said determining step to a desired shooting efficiency and identifying at least one improvement location where the player needs to improve his shooting efficiency;
throwing a plurality of basketballs toward said at least one improvement location so that the player can improve his shooting efficiency at said at least one improvement location.

36. The method as recited in claim 18 wherein said shooting efficiency calculator calculates said shooting efficiency statistics comprising the player's cumulative efficiency for each of said plurality of predetermined different locations for all shots taken by the player at said plurality of predetermined different locations for use by at least one of said coach or player.

37. A system for improving a player's efficiency in shooting a basketball toward a basketball hoop on a basketball backboard associated with a basketball playing area, said system comprising:
a basketball ejector for ejecting basketballs to a plurality of predetermined different locations on the basketball playing area, said basketball ejector comprising a ball ejector coupled to a motor for driving said ball ejector;
a sensor associated with said basketball hoop for sensing when a basketball goes through said basketball hoop;
a shooter efficiency calculator for calculating shooting efficiency statistics of the player at each of said plurality of predetermined different locations;
an interface having a plurality of buttons or indicia arranged in spaced angular positions on a face of the interface to generally correspond to the plurality of predetermined different locations that are angularly spaced on the basketball playing area, said plurality of buttons or indicia being used to select said plurality of predetermined different locations at which one or more basketballs will be ejected, said plurality of predetermined different locations being different angular shooting locations on the basketball playing area at which said basketball ejector may throw said basketball on the basketball playing area, said plurality of buttons being spaced on said interface and each of said plurality of buttons corresponding to one of said different angular shooting locations;
a storage device for storing said shooting efficiency statistics; and
a controller coupled to said motor, said interface, said storage device, shooting efficiency calculator, said basketball ejector and said sensor, said interface further comprising at least one shots button for programming said controller with a number of shots during a predetermined shooting challenge;
said controller being programmed to cause said basketball ejector to eject basketballs to a first one of said plurality of predetermined different locations corresponding to a first one of said plurality of buttons that were actuated and to at least one second one of said plurality of predetermined different locations corresponding to at least one second one of said plurality of buttons that were actuated;
said controller causing said basketball ejector to eject balls to a player located at said first one of said plurality of predetermined different locations for said predetermined shooting challenge, and after said predetermined shooting challenge is met by said player either shooting or making said number of shots that said sensor senses passing through said basketball hoop said controller energizes said motor to cause said ball ejector to pivot or move to a different position to change a direction of ejected balls from a first direction toward said first one of said plurality of predetermined different locations to a second direction toward said at least one second one of said plurality of predetermined different locations after said predetermined shooting challenge is met at said first one of said plurality of predetermined different locations;
said shooting efficiency calculator calculating said shooting efficiency statistics of the player at each of the plurality of predetermined different locations for a plurality of training sessions during which the player used the system, said shooting efficiency statistics being stored on at least one computer for use by the player or a coach, said player or said coach using said interface to program said system so that said controller energizes said basketball ejector to pivot or move to eject or pass balls toward an improvement location in response to the shooting efficiency statistics.

38. The method as recited in claim 37 wherein said plurality of buttons for selecting the plurality of predetermined different locations are arranged in an arc on said interface.

39. The system as recited in claim 37 wherein said interface further comprises a delay button for selecting the delay time, with each of said plurality of buttons, said at least one shots button, an at least one shooting challenge button and said delay button being visible on the interface to the user.

* * * * *